US012677367B2

(12) United States Patent
Peng

(10) Patent No.: US 12,677,367 B2
(45) Date of Patent: Jul. 7, 2026

(54) LIGHT-EMITTING DIODE CIRCUIT WITH SEQUENCE FUNCTION, LIGHT-EMITTING DIODE CIRCUIT PACKAGE, AND LIGHT-EMITTING DIODE LIGHT STRING

(71) Applicant: SEMISILICON TECHNOLOGY CORP., New Taipei City (TW)

(72) Inventor: Wen-Chi Peng, New Taipei City (TW)

(73) Assignee: SEMISILICON TECHNOLOGY CORP., New Taipei City (TW)

( * ) Notice: Subject to any disclaimer, the term of this patent is extended or adjusted under 35 U.S.C. 154(b) by 104 days.

(21) Appl. No.: 18/633,753

(22) Filed: Apr. 12, 2024

(65) Prior Publication Data

US 2025/0324499 A1 Oct. 16, 2025

(51) Int. Cl.
*H05B 47/165* (2020.01)
*H05B 45/34* (2020.01)
*H05B 45/46* (2020.01)

(52) U.S. Cl.
CPC ........... *H05B 47/165* (2020.01); *H05B 45/34* (2020.01); *H05B 45/46* (2020.01)

(58) Field of Classification Search
CPC .................. H05B 47/165; H05B 45/46; H05B 45/34-35; H05B 45/44-48
See application file for complete search history.

(56) References Cited

U.S. PATENT DOCUMENTS

| | | | | |
|---|---|---|---|---|
| 11,019,695 | B1 | 5/2021 | Peng | |
| 2017/0110979 | A1* | 4/2017 | Chang | G05F 1/563 |
| 2017/0374712 | A1* | 12/2017 | Qu | H05B 45/46 |
| 2021/0153322 | A1* | 5/2021 | Grave | H10H 20/857 |
| 2021/0356089 | A1* | 11/2021 | Miskin | F21V 23/001 |

FOREIGN PATENT DOCUMENTS

| | | | |
|---|---|---|---|
| TW | I767698 | B | 6/2022 |
| TW | I779721 | B | 10/2022 |

* cited by examiner

*Primary Examiner* — Renan Luque
(74) *Attorney, Agent, or Firm* — MUNCY, GEISSLER, OLDS & LOWE, P.C.

(57) ABSTRACT

A LED circuit with a sequence function includes a load component, a capacitive component, a current load, and a voltage processor. The load component provides a resistance value. The capacitive component is connected to the load component in series at anode. The capacitive component provides a capacitance value, and generates an inner voltage at the node. The current load is connected in parallel to the load component and the capacitive component to provide a current path. The voltage processor receives the inner voltage and a threshold voltage, and compares the inner voltage with the threshold voltage to generate a comparison signal. The LED circuit counts time to acquire a time value from a starting time when the voltage processor starts to generate the comparison signal to a time when a level of the comparison signal changes, and uses the time value for sequencing.

21 Claims, 14 Drawing Sheets

LIGHT-EMITTING DIODE CIRCUIT WITH SEQUENCE FUNCTION, LIGHT-EMITTING DIODE CIRCUIT PACKAGE, AND LIGHT-EMITTING DIODE LIGHT STRING

BACKGROUND

Technical Field

The present disclosure relates to a light-emitting diode (LED) circuit, a LED circuit package, and a LED light string, and more particularly to a LED circuit with a sequence function, a LED circuit package, and a LED light string.

Description of Related Art

The statements in this section merely provide background information related to the present disclosure and do not necessarily constitute prior art.

Since light-emitting diode (LED) has the advantages of high luminous efficiency, low power consumption, long life span, fast response, high reliability, etc., LEDs have been widely used in lighting fixtures or decorative lighting, such as Christmas tree lighting, lighting effects of sport shoes, etc. by connecting light bars or light strings in series, parallel, or series-parallel.

Take the festive light for example. Basically, a complete LED lamp includes an LED light string having a plurality of LEDs and a drive unit for driving the LEDs. The drive unit is electrically connected to the LED light string, and controls the LEDs by a pixel control manner or a synchronous manner by providing the required power and the control signal having light data to the LEDs, thereby implementing various lighting output effects and changes of the LED lamp.

According to the present technology, in order to drive the LEDs of the LED light string to diversify light emission, the LEDs have different address sequence data. The LEDs receive light signals including light data and address data. If the address sequence data of the LEDs are the same as the address data of the light signals, the LEDs emit light according to the light data of the light signals. If the address sequence data of the LEDs are not the same as the address data of the light signals, the LEDs ignore the light data of the light signals.

At present, most of the LED sequence methods of the LED light string are complicated and/or difficult. For example, before the LEDs are combined into an LED light string, it is necessary to burn different address sequence data for each LED. Afterward, the LEDs are sequentially arranged and combined into the LED light string according to the address sequence data. If the LEDs are not arranged in sequence according to the address sequence data, the diversified light emission of the LEDs cannot be correctly achieved.

Furthermore, when current LED light strings adopt low-voltage (such as 5 volts) DC carrier parallel light strings, in order to achieve carrier control, each LED light on the light string needs to be sequenced first so as to facilitate subsequent carrier control to drive the lighting mode. However, since the current of low-voltage LED light strings is easily affected by disturbances, if the current is unstable, the voltage signal will become unstable, and the control IC in the LED light will not be able to accurately identify the signal.

Therefore, how to design a LED circuit, a LED circuit package, and a LED light string, and more particularly to a LED circuit with a sequence function, a LED circuit package, and a LED light string to solve the problems and technical bottlenecks in the existing technology has become a critical topic in this field.

SUMMARY

An objective of the present disclosure is to provide a light-emitting diode (LED) circuit with a sequence function. The LED circuit includes a load component, a capacitive component, a current load, and a voltage processor. The load component provides a resistance value. The capacitive component is connected in series to the load component at a node, and the capacitive component provides a capacitance value and generates an inner voltage at the node. The current load is connected in parallel to the load component and the capacitive component, and the current load provides a current path. The voltage processor receives the inner voltage, and compares the inner voltage with a threshold voltage to generate a comparison signal. The LED circuit counts time to acquire a time value from a starting time when the voltage processor starts to generate the comparison signal to a time when a level of the comparison signal changes, and uses the time value for sequencing.

Another objective of the present disclosure is to provide a light-emitting diode (LED) circuit with a sequence function. The LED circuit includes a load component and a voltage processor. The load component provides a resistance value, and an inner voltage is generated at a second terminal of the load component. The voltage processor receives the inner voltage, and compares the inner voltage with a threshold voltage to generate a comparison signal. The LED circuit counts time to acquire a time value from a starting time when the voltage processor starts to generate the comparison signal to a time when a level of the comparison signal changes, and uses the time value for sequencing.

Another further objective of the present disclosure is to provide a light-emitting diode (LED) circuit package with a sequence function. The LED circuit package includes two power pins, at least one LED diode, a LED circuit, and a package. The two power pins receive a voltage. The at least one LED is coupled to the two power pins. The LED circuit is coupled to the two power pins and the at least one LED, and the LED circuit is supplied power by the voltage through the two power pins. The package packages the LED circuit, the at least one LED, and a part of the two power pins, wherein each power pin is partially exposed outside the package.

Another further objective of the present disclosure is to provide a light-emitting diode (LED) light string with a sequence function. The LED light string includes a plurality of LED circuits. The plurality of LED circuits externally receives a voltage and are supplied power by the voltage, and an inner voltage of each LED circuit is gradually changed. A plurality of transition times when the inner voltages of the LED circuits respectively reach a threshold voltage, and therefore the sequence of the corresponding LED circuits is determined according to a plurality of time differences from a starting time to the plurality of transition times respectively.

Accordingly, the present disclosure has the following features and advantages: 1. the LED light string of the present disclosure does not require the use of additional external resistors, switches or constant current circuits or devices, thereby making the light string structure simple and simplifying circuit design; 2. the LED light string of the present disclosure does not need to add a power setting circuit at the end of the circuit or an IC inside the lamp connected to a resistor in series, and sequencing (sequence number) the LED circuits is implemented using digital circuits to make the control more stable and accurate.

It is to be understood that both the foregoing general description and the following detailed description are exemplary, and are intended to provide further explanation of the present disclosure as claimed. Other advantages and features of the present disclosure will be apparent from the following description, drawings, and claims.

BRIEF DESCRIPTION OF DRAWINGS

The present disclosure can be more fully understood by reading the following detailed description of the embodiment, with reference made to the accompanying drawing as follows.

DETAILED DESCRIPTION

Figure 1:
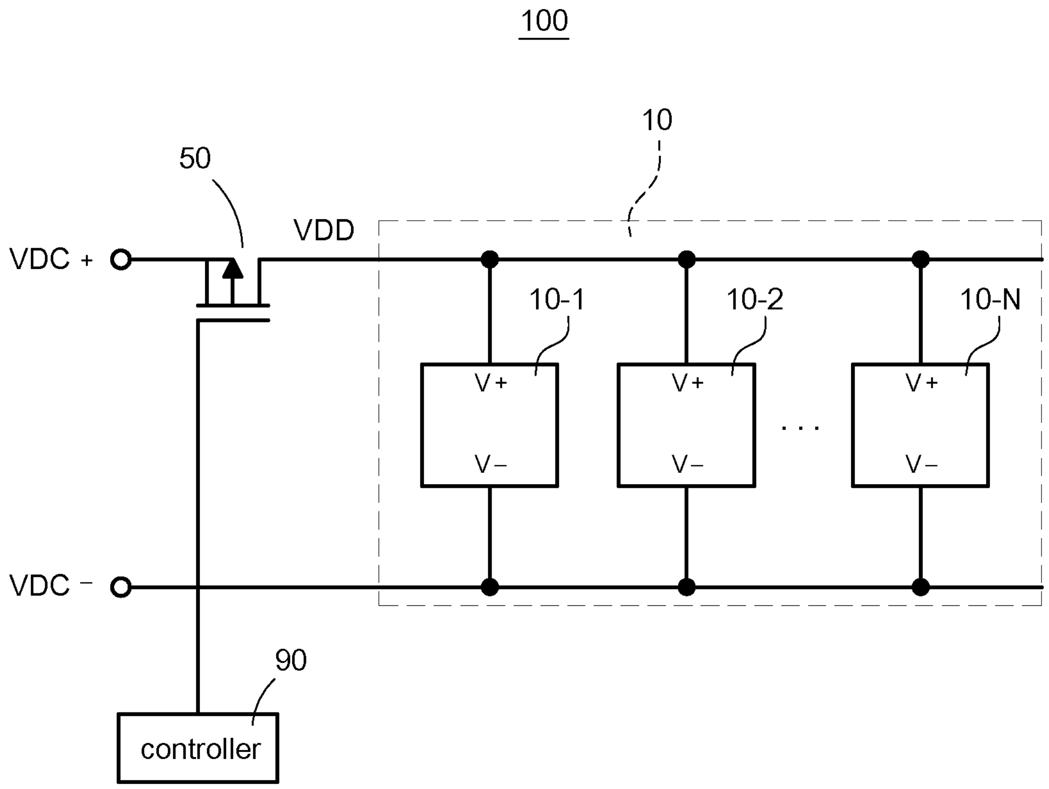
FIG. 1 is a block circuit diagram of a light-emitting diode (LED) light string with a sequence function in a parallel structure according to the present disclosure.

Reference will now be made to the drawing figures to describe the present disclosure in detail. It will be understood that the drawing figures and exemplified embodiments of present disclosure are not limited to the details thereof.

The implementation of the present disclosure is described below through specific examples, and those who are familiar with this technology can easily understand other advantages and effects of the present disclosure from the content disclosed in this specification. The present disclosure can also be implemented or applied through other different specific examples, and the details in the present disclosure can also be modified and changed based on different viewpoints and applications without departing from the spirit of the present disclosure.

Please refer to FIG. 1, which shows a block circuit diagram of a light-emitting diode (LED) light string with a sequence function in a parallel structure according to the present disclosure. The LED light string with a sequence function 100 (hereinafter abbreviated as "LED light string") includes a plurality of LED circuits 10, a power switch 50, and a controller 90. The plurality of LED circuits 10 include a first LED circuit 10-1, a second LED circuit 10-2, . . . , and a Nth LED circuit 10-N. The plurality of LED circuits 10-1 to 10-N receives a voltage VDD provided by an external power source and are supplied power by the voltage VDD. The voltage VDD is, for example but not limited to, a direct-current (DC) voltage, a pulse voltage, or a carrier voltage. The external power source includes a positive voltage terminal VDC+ and a negative voltage terminal VDC−, and therefore each LED circuit 10-1 to 10-N has a positive terminal V+ and a negative terminal V−, and the positive terminals V+ and the negative terminals V− are correspondingly electrically connected to the positive voltage terminal VDC+ and the negative voltage terminal VDC− so that the LED circuits 10-1 to 10-N are supplied power by the voltage VDD.

The power switch 50 is disposed on a power-supplying path of the external power source to the LED circuits 10-1 to 10-N. In one embodiment, as shown in FIG. 1, the power-supplying path is coupled to the positive voltage terminal VDC+ of the external power source. However, this does not limit the present disclosure, that is, the power-supplying path may be coupled to the negative voltage terminal VDC− of the external power source (not shown).

The controller 90 is coupled to the power switch 50. When the controller 90 controls the power switch 50 to be turned on, the voltage VDD provided by the external power source supplies power to the LED circuits 10-1 to 10-N so as to power on the LED light string 100. When the controller 90 controls the power switch 50 to be turned off, the voltage VDD provided by the external power source stops to supply power to the LED circuits 10-1 to 10-N.

Figure 3:
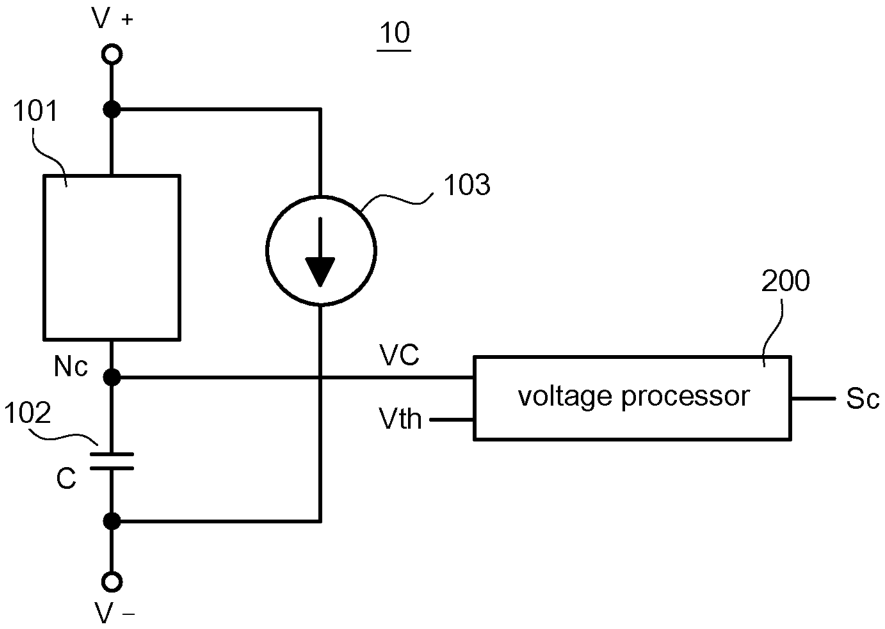
FIG. 3 is a block circuit diagram of a single LED circuit in a parallel structure according to the present disclosure.

Please refer to FIG. 3, which shows a block circuit diagram of a single LED circuit in a parallel structure according to the present disclosure. Each LED circuit 10-1 to 10-N shown in FIG. 1 includes a load component 101, a capacitive component 102, a current load 103, and a voltage processor 200. The load component 101 provides a resistance value. The capacitive component 102 is connected in series to the load component 101 at a node Nc, and the capacitive component 102 provides a capacitance value and generates an inner voltage VC at the node Nc. The current load 103 is connected in parallel to the load component 101 and the capacitive component 102 connected in series, and the current load 103 provides a current path.

The voltage processor 200 receives the inner voltage VC, and compares the inner voltage VC with a threshold voltage Vth to generate a comparison signal Sc. In particular, the threshold voltage Vth may be externally provided to the voltage processor 200. Alternatively, the threshold voltage Vth may be generated inside the voltage processor 200. FIG.

3 is just for convenience to illustrate the comparison of the inner voltage VC and the threshold voltage Vth. In particular, the LED circuit 10-1 to 10-4 counts time to acquire a time value from a starting time when the voltage processor 200 starts to generate the comparison signal Sc to a time when a level of the comparison signal Sc changes, and uses the time value for sequencing, and more details later.

Specific embodiments of the load component 101 and the capacitive component 102 are described below. Please refer to FIG. 4A, which shows a block circuit diagram of the single LED circuit in a parallel structure according to a first embodiment of the present disclosure. In the first embodiment, the load component 101 is a resistor R, and the capacitive component 102 is a capacitor C. In particular, an impedance value of the resistor R and a capacitance value of the capacitor C are used to determine the time for charging the capacitive component 102 to the inner voltage VC. The smaller a time constant (the product of the impedance value and the capacitance value), the faster the capacitive component 102 is charged; on the contrary, the larger the time constant, the slower the capacitive component 102 is charged.

Figure 4A:
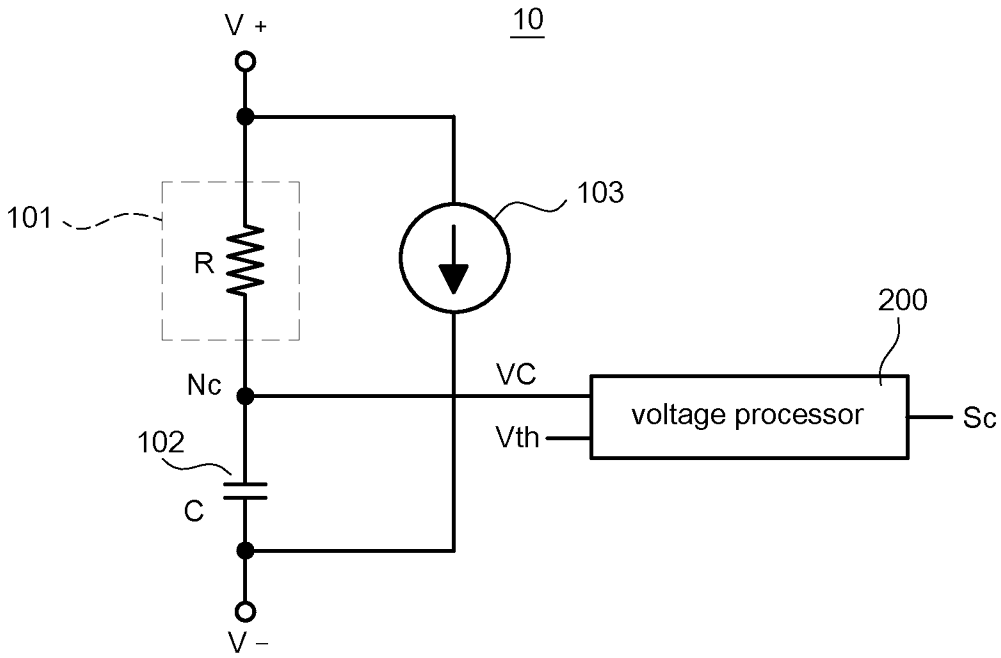
FIG. 4A is a block circuit diagram of the single LED circuit in a parallel structure according to a first embodiment of the present disclosure.
Figure 4B:
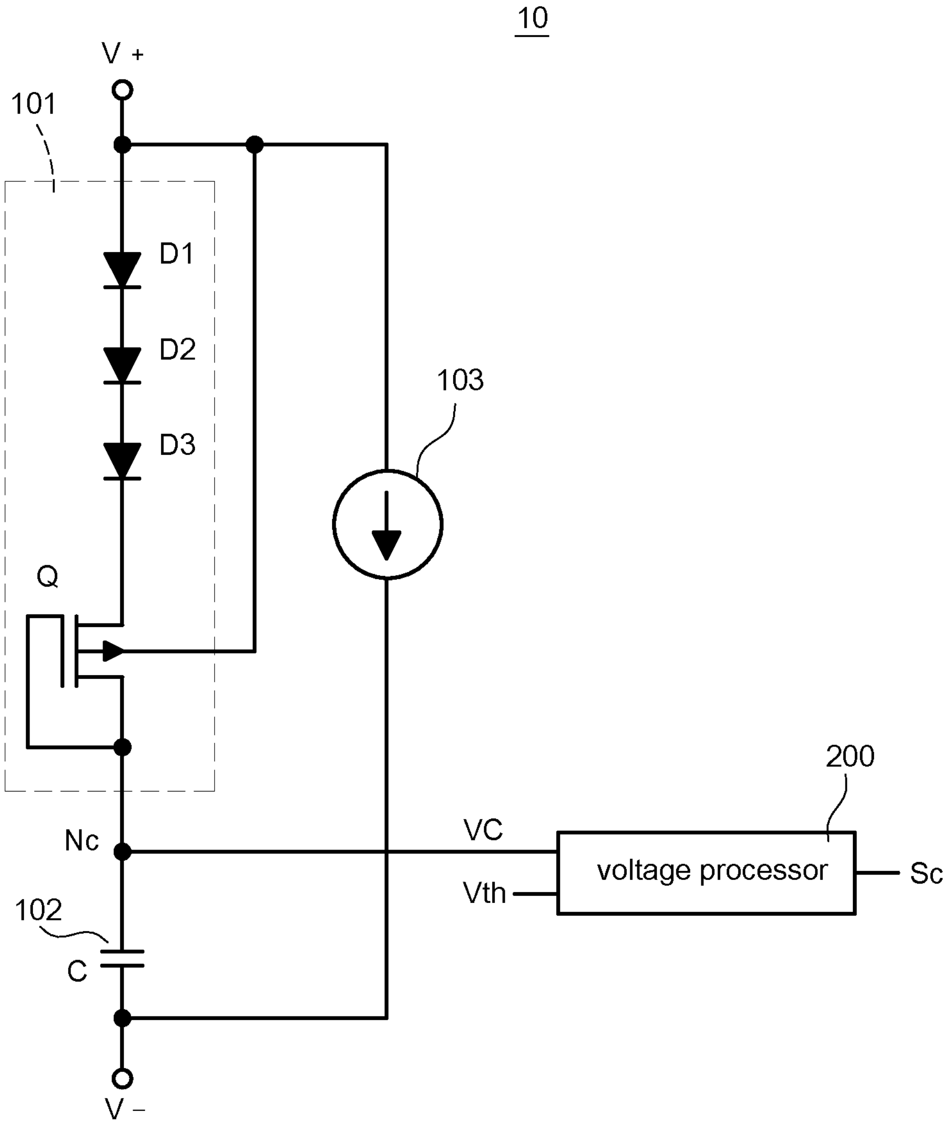
FIG. 4B is a block circuit diagram of the single LED circuit in a parallel structure according to a second embodiment of the present disclosure.

Please refer to FIG. 4B, which shows a block circuit diagram of the single LED circuit in a parallel structure according to a second embodiment of the present disclosure. In the second embodiment, the load component 101 includes a plurality of diodes D1, D2, D3 and a transistor switch Q (for example, but not limited to a MOSFET) connected in series, and the capacitive component 102 is a capacitor C. The self-impedance values of the series-connected diodes D1, D2, D3 and the self-impedance value of the transistor switch Q (for example, a P-type MOSFET switch) form an equivalent impedance value. In particular, the equivalent impedance value and a capacitance value of the capacitor C are used to determine the time for charging the capacitive component 102 to the inner voltage VC. The smaller a time constant (the product of the impedance value and the capacitance value), the faster the capacitive component 102 is charged; on the contrary, the larger the time constant, the slower the capacitive component 102 is charged.

Figure 4C:
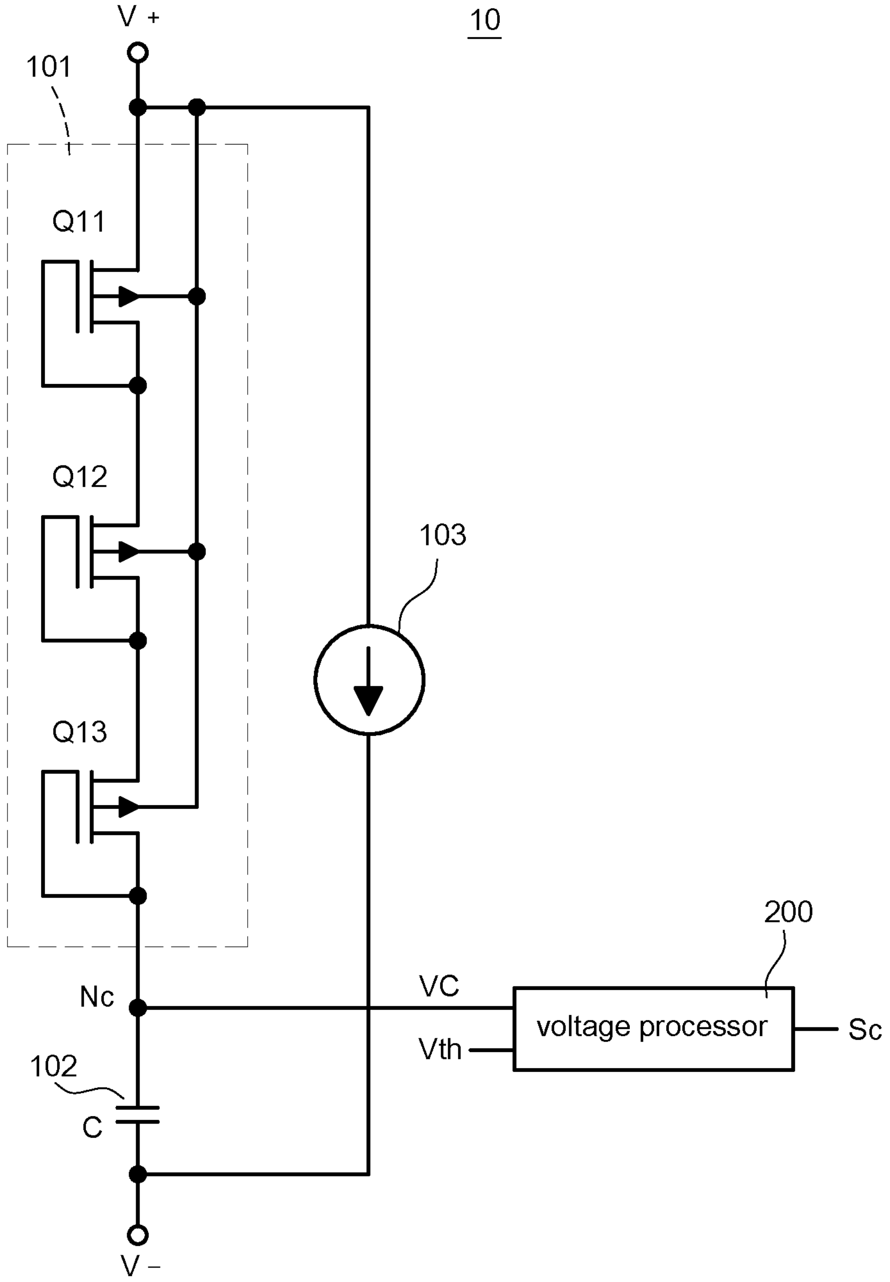
FIG. 4C is a block circuit diagram of the single LED circuit in a parallel structure according to a third embodiment of the present disclosure.

Please refer to FIG. 4C, which shows a block circuit diagram of the single LED circuit in a parallel structure according to a third embodiment of the present disclosure. In the third embodiment, the load component 101 includes a plurality of transistor switches Q11, Q12, Q13 (for example, but not limited to P-type MOSFET switches) connected in series, and the capacitive component 102 is a capacitor C. The self-impedance values of the series-connected transistor switches Q11, Q12, Q13 form an equivalent impedance value. In particular, the equivalent impedance value and a capacitance value of the capacitor C are used to determine the time for charging the capacitive component 102 to the inner voltage VC. The smaller a time constant (the product of the impedance value and the capacitance value), the faster the capacitive component 102 is charged; on the contrary, the larger the time constant, the slower the capacitive component 102 is charged.

Figure 4D:
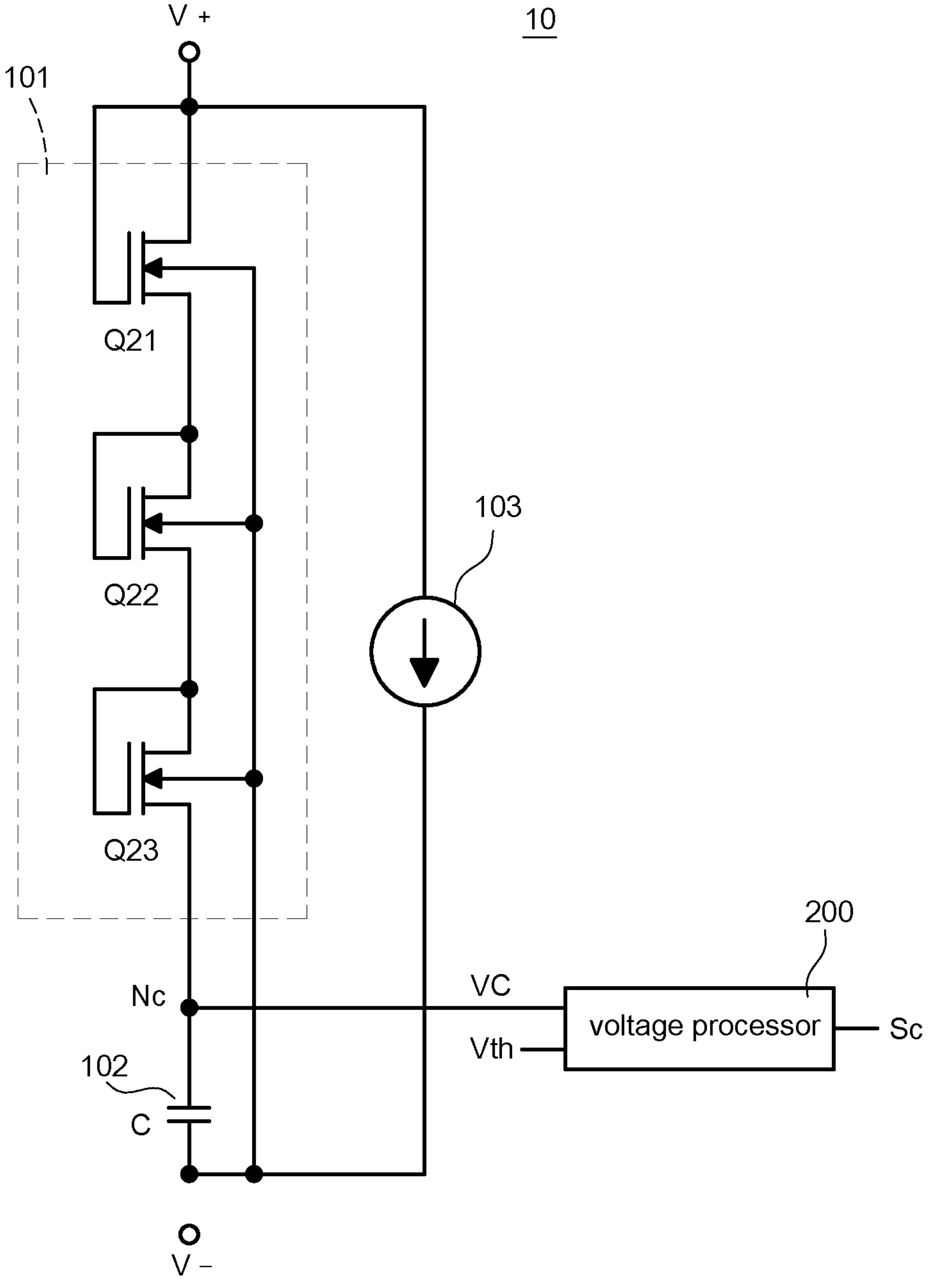
FIG. 4D is a block circuit diagram of the single LED circuit in a parallel structure according to a fourth embodiment of the present disclosure.

Please refer to FIG. 4D, which shows a block circuit diagram of the single LED circuit in a parallel structure according to a fourth embodiment of the present disclosure. In the fourth embodiment, the load component 101 includes a plurality of transistor switches Q21, Q22, Q23 (for example, but not limited to N-type MOSFET switches) connected in series, and the capacitive component 102 is a capacitor C. The self-impedance values of the series-connected transistor switches Q21, Q22, Q23 form an equivalent impedance value. In particular, the equivalent impedance value and a capacitance value of the capacitor C are used to determine the time for charging the capacitive component 102 to the inner voltage VC. The smaller a time constant (the product of the impedance value and the capacitance value), the faster the capacitive component 102 is charged; on the contrary, the larger the time constant, the slower the capacitive component 102 is charged.

Figure 7:
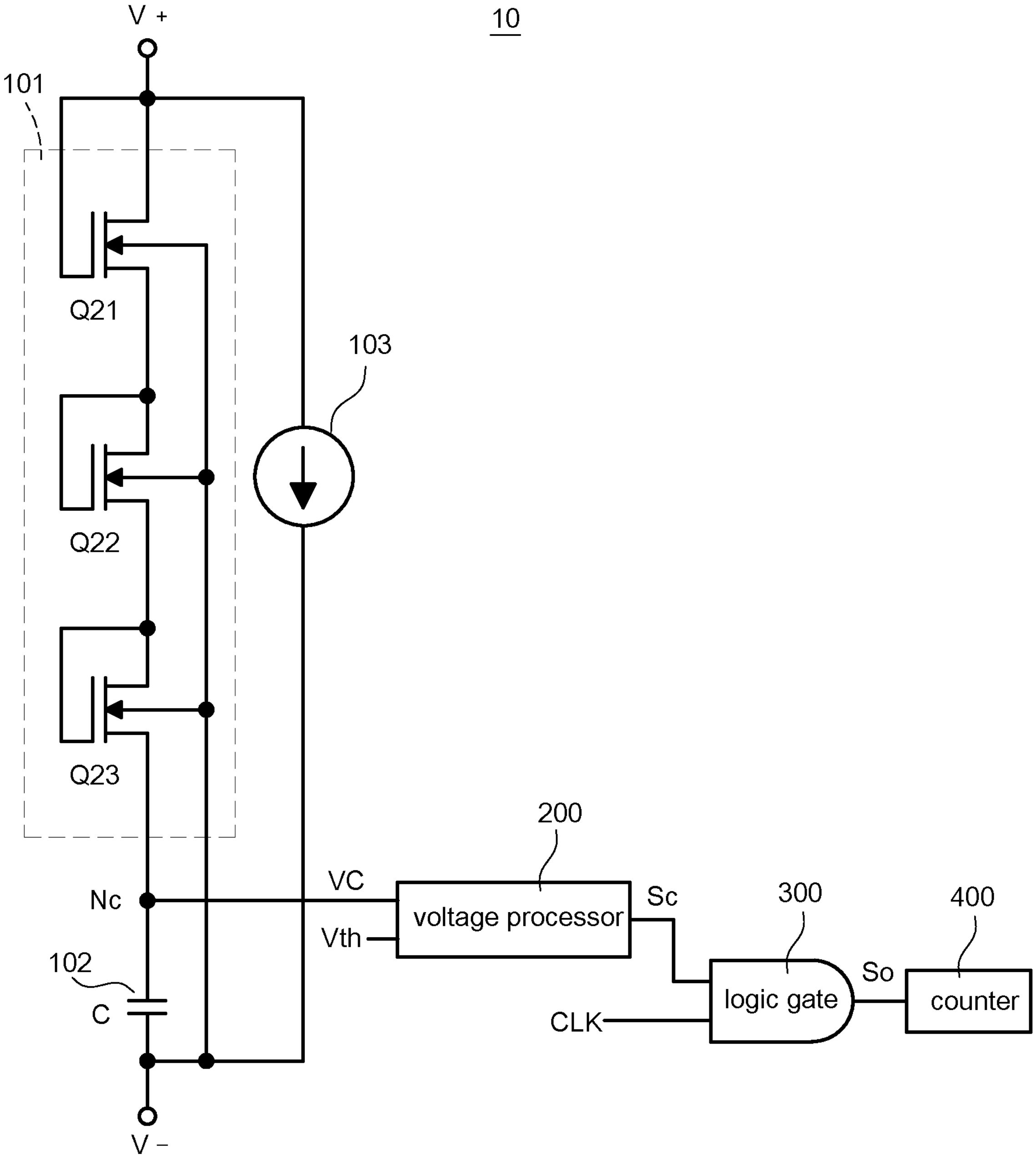
FIG. 7 is a block circuit diagram of time counting of the single LED circuit in a parallel structure according to the present disclosure.

The specific operation of the LED light string 100 with the sequence function of the present disclosure will be described in detail below. Please refer to FIG. 7, which shows a block circuit diagram of time counting of the single LED circuit in a parallel structure according to the present disclosure, and also refer to FIG. 1. As shown in FIG. 7, the structure of FIG. 4D will be taken as an example for explanation. Each LED circuit 10-1 to 10-N with the sequence function of the present disclosure further includes a logic gate 300 and a counter 400.

As shown in FIG. 7, the logic gate 300 is an AND gate, and the logic gate 300 performs a logic union operation on input signals. The logic gate 300 receive the comparison signal Sc provided by the voltage processor 200 and a clock signal CLK, and performs the logic union operation on the comparison signal Sc and the clock signal CLK to generate an output signal So. The counter 400 is connected to the logic gate 300, and receives the output signal So provided by the logic gate 300.

The LED circuit 10-1 to 10-N is supplied power by a voltage and an inner voltage VC is gradually changed. When the inner voltage VC has not reached the threshold voltage Vth, the comparison signal Sc causes the output signal So to be the clock signal CLK and the counter 400 counts time. Until the inner voltage VC reaches the threshold voltage Vth, the comparison signal Sc causes the output signal So to stop the counter 400 from counting the clock signal CLK so as to acquire the time value during the counter counting time. Incidentally, the inner voltage exemplified in this embodiment is gradually increasing, but this does not limit the present disclosure. In other words, the inner voltage may be gradually decreased ss an example. As long as the matching voltage determination mechanism is changed accordingly, means that can also achieve the technical purpose of this embodiment should be included in the scope of the present disclosure. Specifically, when the inner voltage VC has not reached the threshold voltage Vth, i.e., the inner voltage VC is less than the threshold voltage Vth, the voltage processor 200 outputs the comparison signal Sc with a high level. In this condition, the logic gate 300 performs the logic union (AND) operation on the comparison signal Sc with the high level and the clock signal CLK to cause the output signal So to be the clock signal CLK. Therefore, the counter 400 (continuously) counts times.

As the inner voltage VC gradually changes and reaches the threshold voltage Vth, that is, the inner voltage VC is equal to (or greater than) the threshold voltage Vth, the voltage processor 200 outputs the comparison signal Sc with a low level, that is, the level of the comparison signal Sc changes from the high level to the low level. In this condition, the logic gate 300 performs the logic union (AND) operation on the comparison signal Sc with the low level and the clock signal CLK to cause the output signal So to stop the counter 400 from counting the clock signal CLK. Therefore, the LED circuit 10-1 to 10-N counts time to acquire the time value from a starting time when the voltage processor 200 starts to generate the comparison signal Sc to a time when a level of the comparison signal changes (for example, from the high level to the low level), and the time value is used for sequencing the LED circuit 10-1 to 10-N.

When the controller 90 turns on the power switch 50, the voltage VDD supplies power to the LED circuits 10-1 to 10-N. At the starting time when the LED light string 100 is powered on, each LED circuit 10-1 to 10-N generates an inner voltage VC that gradually changes. That is, according to the load component 101 and the capacitive component 102 of the LED circuit 10-1 to 10-N shown in FIG. 4A to FIG. 4D, the voltage VDD charges the capacitive component 102 so that the inner voltage VC generated on the node Nc gradually changes.

Figure 9:
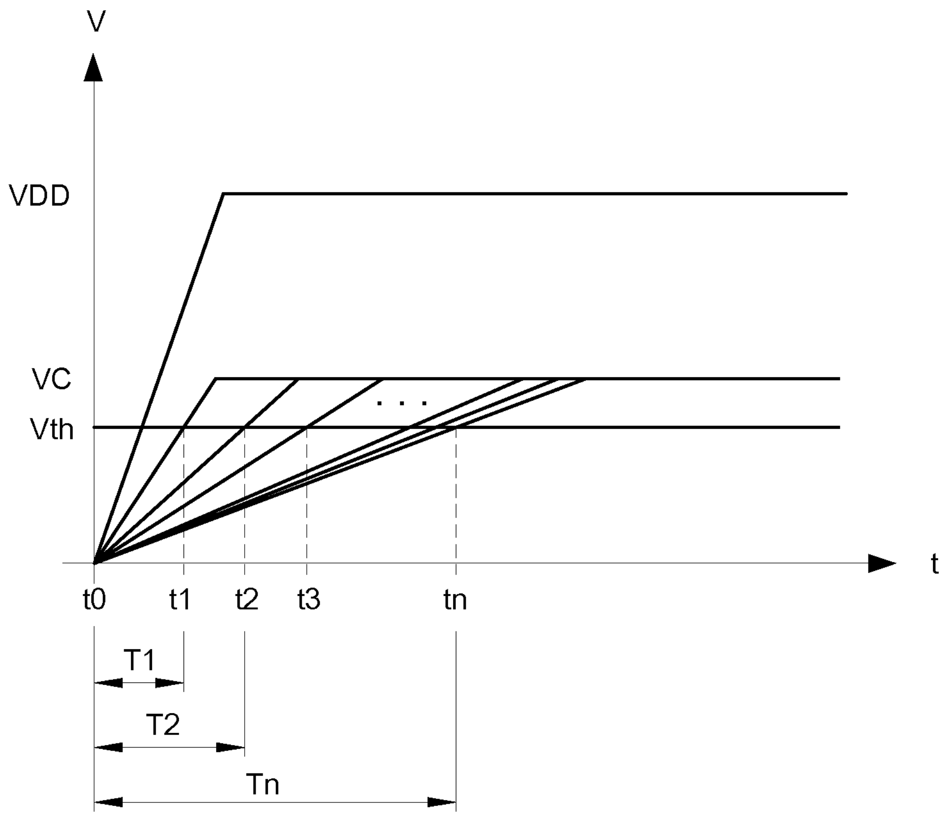
FIG. 9 is a schematic waveform diagram of voltage detection and time counting of the LED circuits according to a first embodiment of the present disclosure.

Please refer to FIG. 9, which shows a schematic waveform diagram of voltage detection and time counting of the LED circuits according to a first embodiment of the present disclosure. The plurality of transition times t1, t2, . . . , tn when the inner voltages VC of the plurality of LED circuits 10-1 to 10-N respectively reach the threshold voltage Vth, i.e., the transition from the high level to the low level at the transition times respectively are produced. Therefore, the sequence of the corresponding LED circuits 10-1 to 10-N is determined according to a plurality of time differences T1, T2, . . . , Tn from the starting time t0 to the plurality of transition times t1, t2, . . . , tn respectively.

Specifically, when the inner voltage VC has not reached the threshold voltage Vth, the comparison signal Sc is high level, and therefore the comparison signal Sc causes the output signal So to be the clock signal CLK and the counter 400 counts time. In one embodiment, the counter 400 counts time once in each clock cycle, and therefore the number of times of the clock signal CLK is accumulated during the counter 400 counting time when the inner voltage VC has not reached the threshold voltage Vth. Until the inner voltage VC reaches the threshold voltage Vth, the comparison signal Sc is changed to low level to cause the output signal So to stop the counter 400 from counting the clock signal CLK so as acquire an accumulated number, and the accumulated number can be correspondingly converted into a time value. As shown in FIG. 9, the plurality of accumulated times acquired by the LED circuits 10-1 to 10-N are the corresponding plurality of transition times transition times t1, t2, . . . , tn. In other words, the first transition time t1 is corresponding to the accumulated number acquired by the first LED circuit 10-1 or the time value from the starting time to the time of transition related to the first LED circuit 10-1. Similarly, the second transition time t2 is corresponding to the accumulated number acquired by the second LED circuit 10-2 or the time value from the starting time to the time of transition related to the second LED circuit 10-2. So on and so forth, the Nth transition time tn is corresponding to the accumulated number acquired by the Nth LED circuit 10-N or the time value from the starting time to the time of transition related to the Nth LED circuit 10-N.

For example, the controller 90 externally generates a clock frequency of a specific frequency as the clock signal CLK as an example for illustration. When the controller 90 turns on the power switch 50 and the LED circuits 10-1 to 10-N are powered on at the staring time, i.e., the time t0 shown in FIG. 9, the controller 90 externally generates the clock frequency of the specific frequency as the clock signal CLK. For the first LED circuit 10-1, the voltage VDD charges the capacitive component 102 so that the inner voltage VC at the node Nc gradually changes. After the voltage processor 200 compares the inner voltage VC with the threshold voltage Vth, the comparison signal Sc outputted from the voltage processor 200 is in a high level if the inner voltage VC is less than the threshold voltage Vth. In this condition, the comparison signal Sc causes the output signal So outputted from the logic gate 300 to be the clock signal CLK, and therefore the counter 400 counts time once in each clock cycle to accumulate the number of times of the clock signal CLK. Until the time t1 (i.e., the first transition time), the inner voltage VC reaches the thresh voltage Vth, and the comparison signal Sc outputted from the voltage processor 200 is changed to low level. When the logic gate 300 receives the comparison signal Sc with the low level, the output signal So stops the counter 400 from counting the clock signal CLK so as acquire a first accumulated number, for example 100 times. In other words, the first accumulated number is corresponding to the first transition time. In particular, the time value from the starting time t0 to the first transition time t1 is the first time difference T1.

Similarly, for the second LED circuit 10-2, its operation is similar to the first LED circuit 10-1. The difference is that the time it takes for the inner voltage VC on the node Nc to gradually change to the threshold voltage Vth, that is, a second transition time t2 is longer than the first transition time t1, and correspondingly a second transition time t2 is acquired, and therefore a second accumulated number is greater than the first accumulated number, for example 150 times.

Therefore, so on and so forth, for the Nth LED circuit 10-N, its operation is similar to the first LED circuit 10-1 and the second LED circuit 10-2. The difference is that the time it takes for the inner voltage VC on the node Nc to gradually change to the threshold voltage Vth, that is, a Nth transition time tn is longer than the second transition time t2, and correspondingly a Nth transition time tn is acquired, and therefore a Nth accumulated number is greater than the second accumulated number, for example 800 times. Therefore, the sequence of the plurality of LED circuits 10-1 to 10-N are determined based on the plurality of time differences T1, T2, . . . , Tn from the starting time t0 to the transition times t1, t2, . . . , tn. That is, the smaller the time difference T1, T2, . . . , Tn, the sequence (sequence number) of the LED light string is earlier, and the larger the time difference T1, T2, . . . , Tn, the sequence (sequence number) of the LED light string is later.

Figure 10:
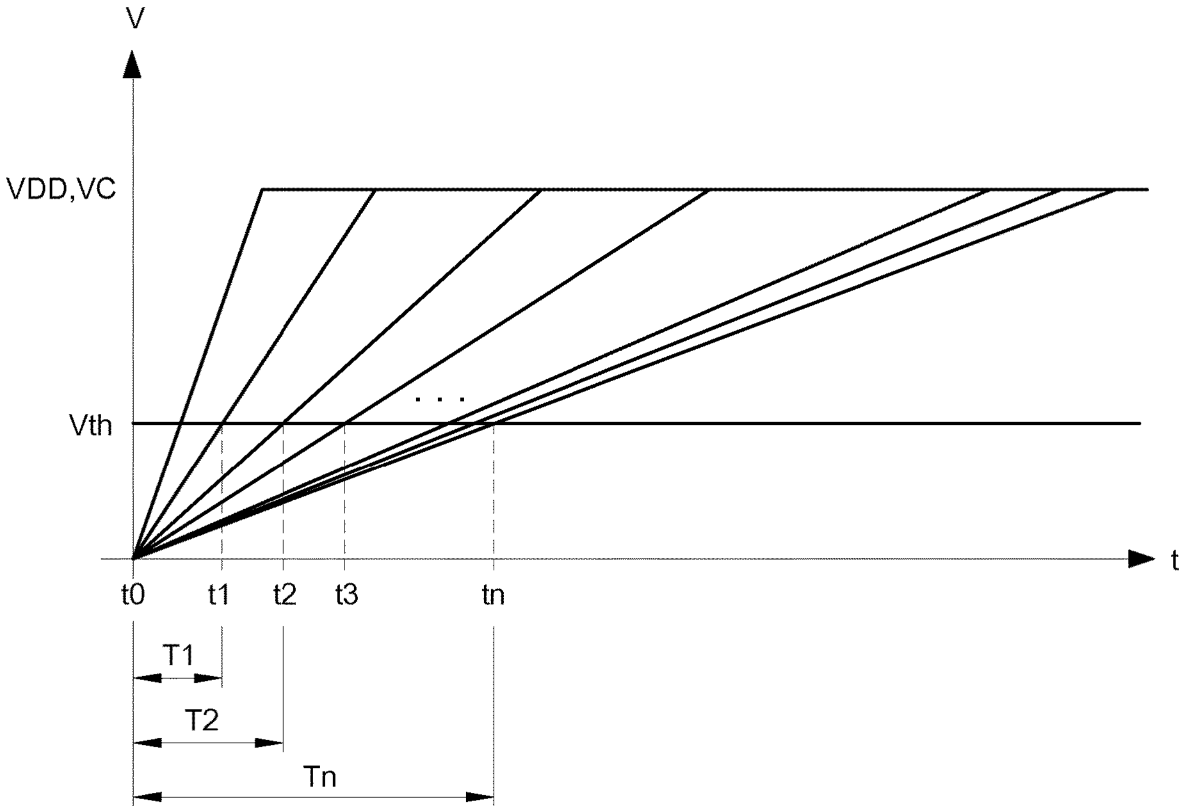
FIG. 10 is a schematic waveform diagram of voltage detection and time counting of the LED circuits according to a second embodiment of the present disclosure.

Compared with the schematic waveform diagram of the first embodiment of voltage detection and time counting shown in FIG. 9, FIG. 10 illustrates the implementation of voltage detection and time counting of the LED circuits 10-1 to 10-N when the load component 101 is a resistor (i.e., as shown in FIG. 4A). There is no difference between the two embodiments of sequencing operations, and therefore will not be described again.

Different from the controller 90 externally generating the clock frequency as the clock signal CLK, in another embodiment, each LED circuit 10-1 to 10-N internally generates a clock frequency as the clock signal CLK. As for the sequencing operations of the LED circuits 10-1 to 10-N, please refer to the previously disclosed content, and therefore will not be described again.

Incidentally, for the controller 90 to externally generate the clock signal CLK, in one embodiment, if the frequency of the clock signal CLK is not fixed, a curve-fitting manner can be used to acquire information on the nonlinear frequency curve to acquire continuous sequence numbers as the basis for sequencing. In another embodiment, if the frequency of the clock signal CLK is fixed, discontinuous sequence numbers can be determined by taking pictures as a basis for sequencing. In further another embodiment, if the frequency of the clock signal CLK is fixed, discontinuous sequence numbers can be mapped into continuous sequence numbers using a lookup table as the basis for sequencing.

For each LED circuit 10-1 to 10-N to internally generate the clock signal CLK, in one embodiment, if the frequency of the clock signal CLK is fixed, discontinuous sequence numbers can be determined by taking pictures as a basis for sequencing. In another embodiment, if the frequency of the clock signal CLK is fixed, discontinuous sequence numbers can be mapped into continuous sequence numbers using a lookup table as the basis for sequencing.

Incidentally, before the LED light string 100 is powered on, the controller 90 turns off the power switch 50 so that the charging voltage (i.e., the inner voltage VC) is discharged to zero, which is beneficial to the fact that after the LED light string 100 is powered on, it can charge the capacitive component 102 so that the charging voltage gradually changes to accurately acquire the accumulated number of times and the time differences so as to correctly determine the sequence of the plurality of LED circuits 10-1 to 10-N.

Figure 2:
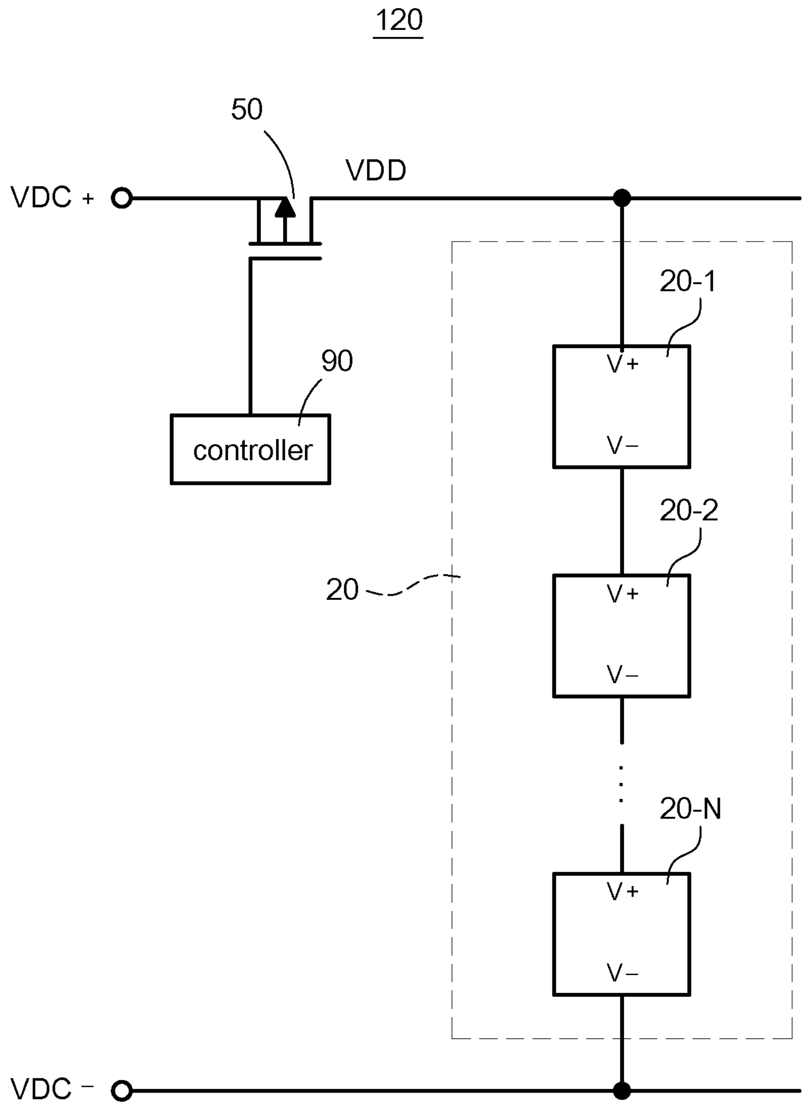
FIG. 2 is a block circuit diagram of the LED light string with the sequence function in a series structure according to the present disclosure.

Please refer to FIG. 2, which shows a block circuit diagram of the LED light string with the sequence function in a series structure according to the present disclosure. Compared with the LED light string shown in FIG. 1 which is a parallel structure, the LED light string shown in FIG. 2 is a series structure. Therefore, the LED light string 120 having a plurality of LED circuits 20-1 to 20-N is electrically connected between the positive voltage terminal VDC+ of the external power source and a negative voltage terminal VDC− of the external power source, and is powered by the voltage VDD. As for the sequencing operation of the LED circuits 20-1 to 20-N of the series-structured LED light string shown in FIG. 2, please refer to the previous disclosure, and therefore will not be described again.

Figure 5:
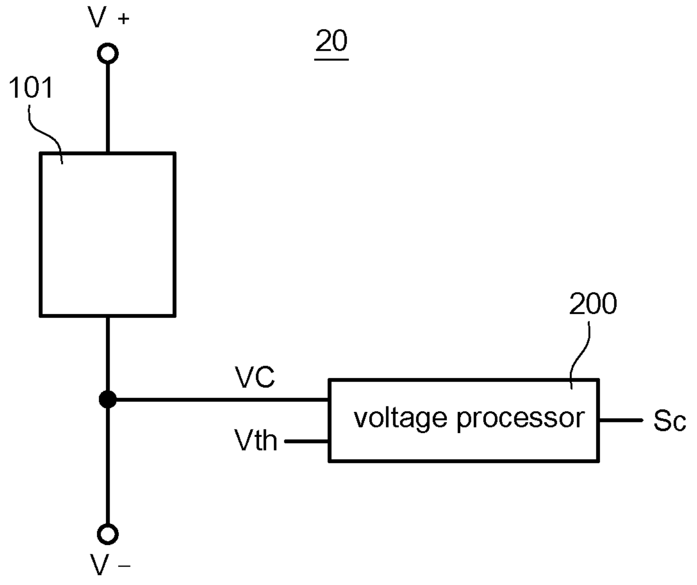
FIG. 5 is a block circuit diagram of a single LED circuit in a series structure according to the present disclosure.
Figure 6A:
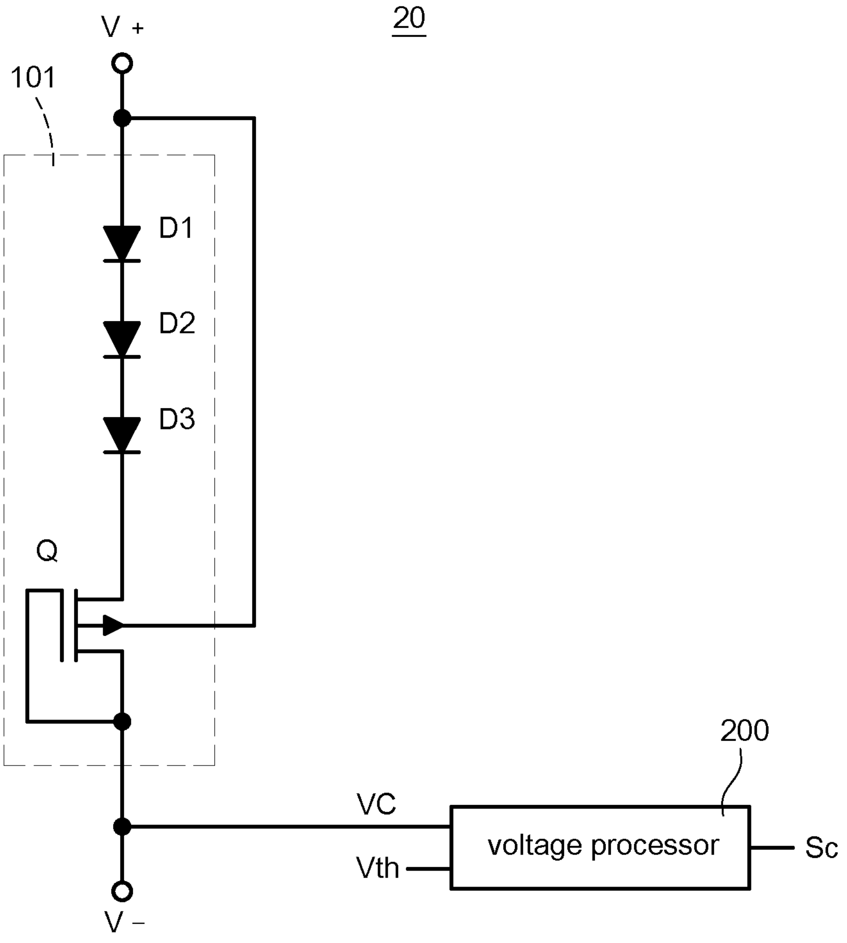
FIG. 6A is a block circuit diagram of the single LED circuit in a series structure according to a first embodiment of the present disclosure.
Figure 6B:
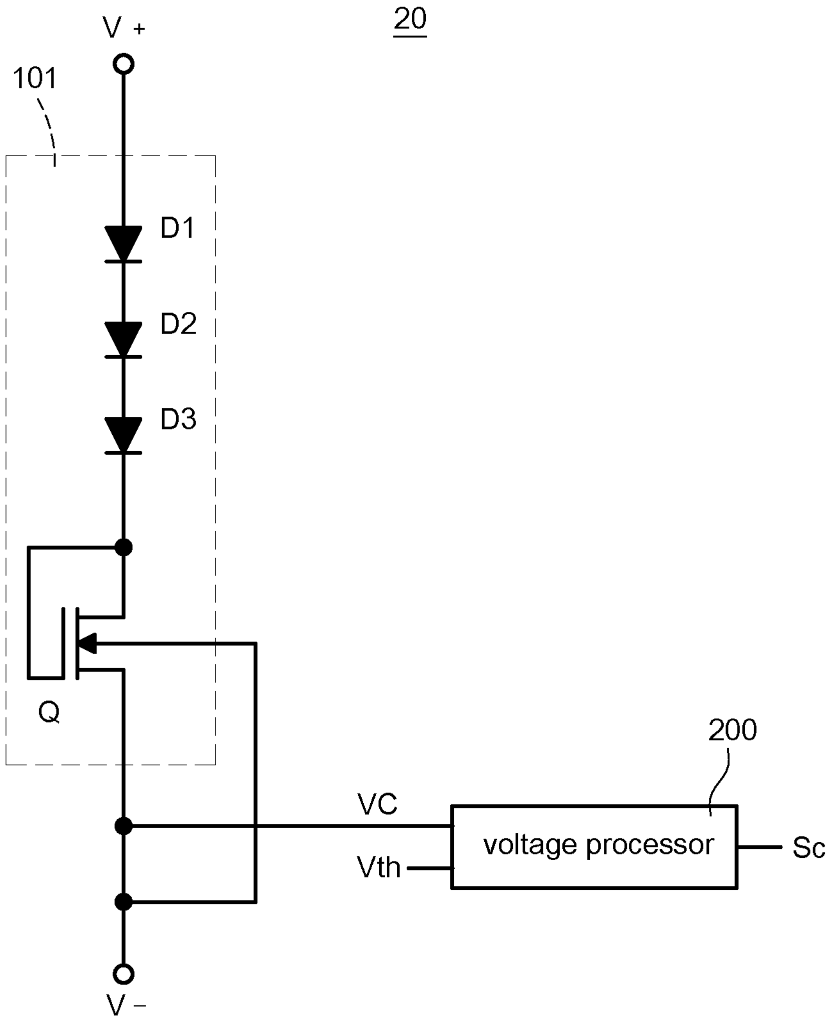
FIG. 6B is a block circuit diagram of the single LED circuit in a series structure according to a second embodiment of the present disclosure.

Please refer to FIG. 5, which shows a block circuit diagram of a single LED circuit in a series structure according to the present disclosure. Each LED circuit 20-1 to 20-N shown in FIG. 2 includes a load component 101 and a voltage processor 200. The load component 101 provides a resistance value, and an inner voltage VC is generated at a second terminal of the load component 101. Moreover, as shown in FIG. 6A and FIG. 6B, which are circuit block diagrams of the first embodiment and the second embodiment of a single LED circuit in a series structure of the present disclosure respectively. Furthermore, the load component 101 may also be the embodiment shown in FIG. 4A to FIG. 4D.

Figure 8:
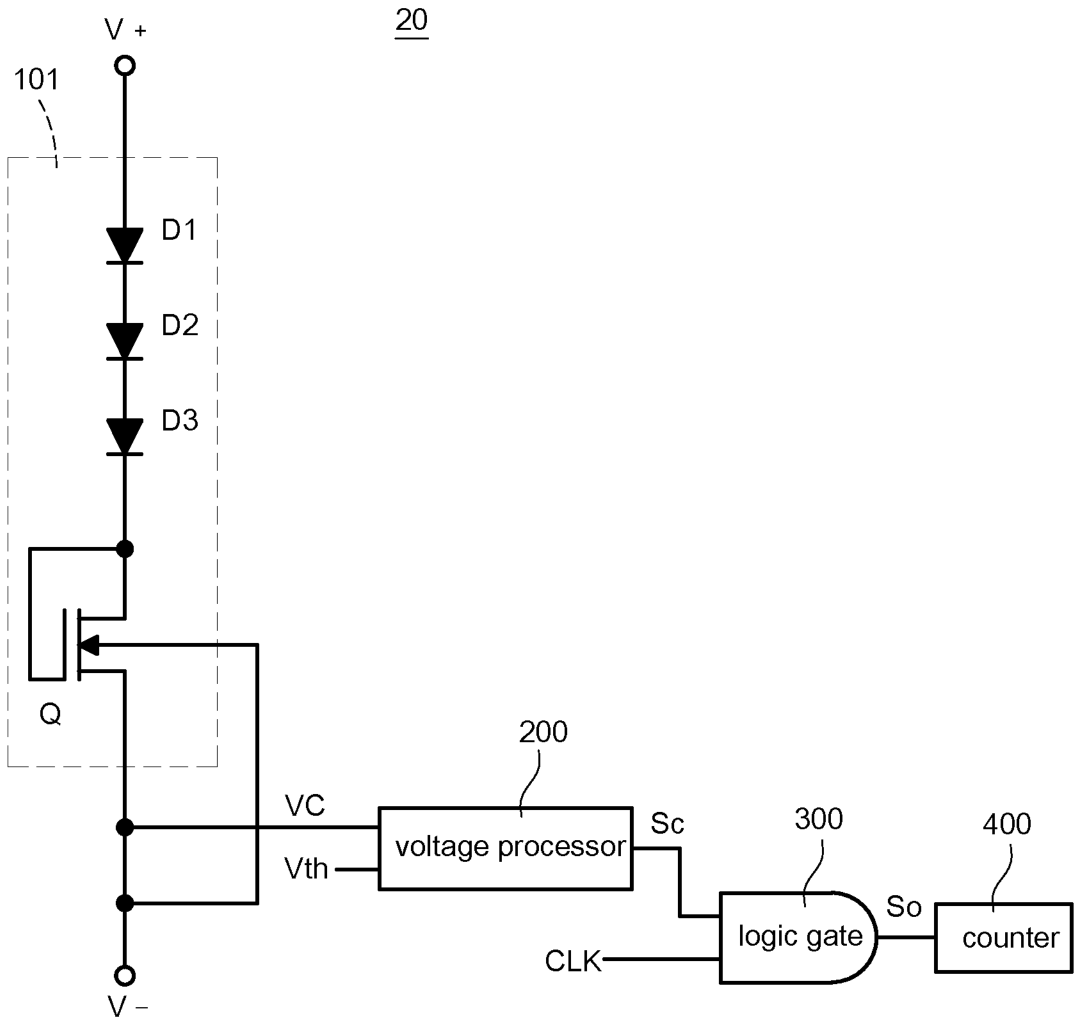
FIG. 8 is a block circuit diagram of time counting of the single LED circuit in a series structure according to the present disclosure.

Please refer to FIG. 8, which shows a block circuit diagram of time counting of the single LED circuit in a series structure according to the present disclosure. Each LED circuit 20-1 to 20-N further includes a logic gate 300 and a counter 400. As for the sequencing operation of the LED circuits 20-1 to 20-N, please refer to the previously disclosed content, and therefore will not be described again.

Figure 11:
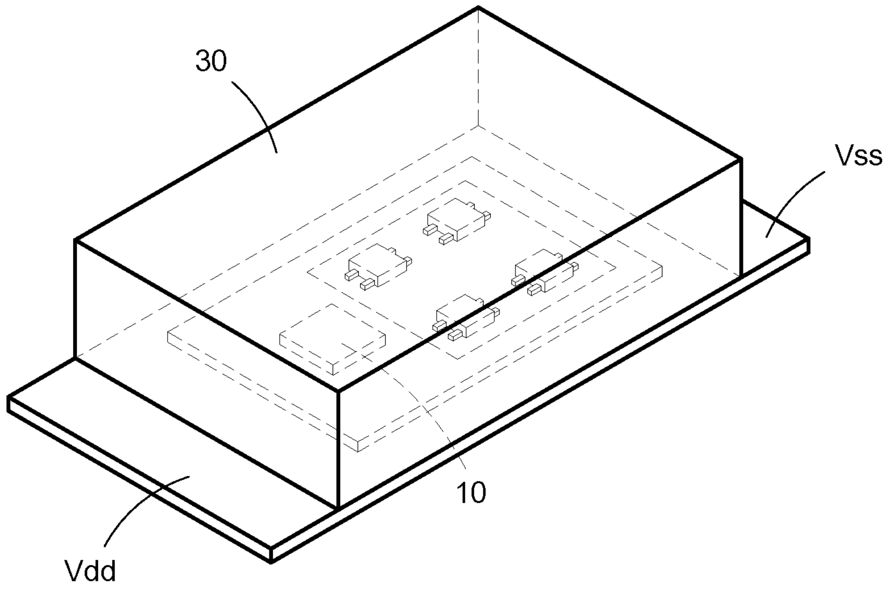
FIG. 11 is a schematic diagram of a packaging structure of a LED circuit package with the sequence function according to the present disclosure.

Please refer to FIG. 11, which shows a schematic diagram of a packaging structure of a LED circuit package with the sequence function according to the present disclosure. The LED circuit package includes two power pins, at least one LED, the LED circuit 10, and a package 30. The two power pins Vdd, Vss are used to receive a voltage signal. The at least one LED is coupled to the power pins Vdd, Vss. For the specific description of the LED circuit 10, please refer to the previous disclosure and will not be repeated here. The package 30 is used to package the LED circuit 10, the at least one LED, and a part of the two power pins Vdd, Vss, and the other part of the two power pins Vdd, Vss is exposed outside the package 30.

In summary, the present disclosure has the following features and advantages:

1. The LED light string of the present disclosure does not require the use of additional external resistors, switches or constant current circuits or devices, thereby making the light string structure simple and simplifying circuit design.

2. The LED light string of the present disclosure does not need to add a power setting circuit at the end of the circuit or an IC inside the lamp connected to a resistor in series, and sequencing (sequence number) the LED circuits is implemented using digital circuits to make the control more stable and accurate.

Although the present disclosure has been described with reference to the preferred embodiment thereof, it will be understood that the present disclosure is not limited to the details thereof. Various substitutions and modifications have been suggested in the foregoing description, and others will occur to those of ordinary skill in the art. Therefore, all such substitutions and modifications are intended to be embraced within the scope of the present disclosure as defined in the appended claims.

What is claimed is:

1. A light-emitting diode circuit with a sequence function, comprising:

- a load component configured to provide a resistance value,
- a capacitive component connected in series to the load component at a node, and the capacitive component configured to provide a capacitance value and generate an inner voltage at the node,
- a current load connected in parallel to the load component and the capacitive component, and the current load configured to provide a current path, and
- a voltage processor configured to receive the inner voltage and a threshold voltage, and compare the inner voltage with the threshold voltage to generate a comparison signal,
- wherein the light-emitting diode circuit counts time to acquire a time value from a starting time when the voltage processor starts to generate the comparison signal to a time when a level of the comparison signal changes, and uses the time value for sequencing.

2. The light-emitting diode circuit as claimed in claim 1, further comprising:

- a logic gate configured to receive the comparison signal and a clock signal, and perform a logic operation on the comparison signal and the clock signal to generate an output signal, and
- a counter configured to receive the output signal,
- wherein the light-emitting diode circuit is supplied power by a voltage and the inner voltage is gradually changed; when the inner voltage has not reached the threshold voltage, the comparison signal causes the output signal to be the clock signal and the counter counts time; until the inner voltage reaches the threshold voltage, the comparison signal causes the output signal to stop the counter from counting so as to acquire the time value during the counter counting time.

3. The light-emitting diode circuit as claimed in claim 1, wherein the load component is a resistor; the capacitive component is a capacitor.

4. The light-emitting diode circuit as claimed in claim 1, wherein the load component comprises a plurality of diodes and a transistor switch connected in series; the capacitive component is a capacitor.

5. The light-emitting diode circuit as claimed in claim 1, wherein the load component comprises a plurality of transistor switches connected in series; the capacitive component is a capacitor.

6. The light-emitting diode circuit as claimed in claim 2, wherein the voltage is a direct-current voltage, a pulse voltage, or a carrier voltage.

7. A light-emitting diode circuit with a sequence function, comprising:

a load component configured to provide a resistance value, and an inner voltage is generated at a second terminal of the load component, and a voltage processor configured to receive the inner voltage and a threshold voltage, and compare the inner voltage with the threshold voltage to generate a comparison signal, wherein the light-emitting diode circuit is configured to count time to acquire a time value from a starting time when the voltage processor starts to generate the comparison signal to a time when a level of the comparison signal changes, and uses the time value for sequencing.

8. The light-emitting diode circuit as claimed in claim 7, further comprising:

a logic gate configured to receive the comparison signal and a clock signal, and perform a logic operation on the comparison signal and the clock signal to generate an output signal, and a counter configured to receive the output signal, wherein the light-emitting diode circuit is supplied power by a voltage and the inner voltage is gradually changed; when the inner voltage has not reached the threshold voltage, the comparison signal causes the output signal to be the clock signal and the counter counts time; until the inner voltage reaches the threshold voltage, the comparison signal causes the output signal to stop the counter from counting so as to acquire the time value during the counter counting time.

9. The light-emitting diode circuit as claimed in claim 7, wherein the load component is a resistor.

10. The light-emitting diode circuit as claimed in claim 7, wherein the load component comprises a plurality of diodes and a transistor switch connected in series.

11. The light-emitting diode circuit as claimed in claim 7, wherein the load component comprises a plurality of transistor switches connected in series.

12. The light-emitting diode circuit as claimed in claim 8, wherein the voltage is a direct-current voltage, a pulse voltage, or a carrier voltage.

13. A light-emitting diode circuit package with a sequence function, comprising:

two power pins configured to receive a voltage, at least one light-emitting diode coupled to the two power pins, a light-emitting diode circuit coupled to the two power pins and the at least one light-emitting diode, and the light-emitting diode circuit being supplied power and an inner voltage being generated by the voltage through the two power pins, wherein the inner voltage of the light-emitting diode circuit is gradually changed, and a package configured to package the light-emitting diode circuit, the at least one light-emitting diode, and a part of the two power pins, wherein each power pin is partially exposed outside the package, wherein the light-emitting diode circuit counts time from a starting time to acquire a time value, and uses the time value for sequencing when the inner voltage reaches a threshold voltage.

14. A light-emitting diode light string with a sequence function, comprising:

a plurality of light-emitting diode circuits configured to externally receive a voltage and supplied power by the voltage, and an inner voltage of each light-emitting diode circuit being gradually changed, wherein a plurality of transition times when the inner voltages of the light-emitting diode circuits respectively reach a threshold voltage, and therefore the sequence of the corresponding light-emitting diode circuits is determined according to a plurality of time differences from a starting time to the plurality of transition times respectively.

15. The light-emitting diode light string as claimed in claim 14, wherein the light-emitting diode circuits are connected in parallel, and each light-emitting diode circuit comprises:

a load component configured to provide a resistance value, a capacitive component connected in series to the load component at a node, and the capacitive component configured to provide a capacitance value and generate an inner voltage at the node, a current load connected in parallel to the load component and the capacitive component connected in series, and the current load configured to provide a current path, and a voltage processor configured to receive the inner voltage and a threshold voltage, and compare the inner voltage with the threshold voltage to generate a comparison signal, wherein the light-emitting diode circuit counts time to acquire a time value from a starting time when the voltage processor starts to generate the comparison signal to a time when a level of the comparison signal changes, and uses the time value for sequencing.

16. The light-emitting diode light string as claimed in claim 15, wherein each light-emitting diode circuit further comprises:

a logic gate configured to receive the comparison signal and a clock signal, and perform a logic operation on the comparison signal and the clock signal to generate an output signal, and a counter configured to receive the output signal, wherein the light-emitting diode circuit is supplied power by a voltage and the inner voltage is gradually changed; when the inner voltage has not reached the threshold voltage, the comparison signal causes the output signal to be the clock signal and the counter counts time; until the inner voltage reaches the threshold voltage, the comparison signal causes the output signal to stop the counter from counting so as to acquire the time value during the counter counting time.

17. The light-emitting diode light string as claimed in claim 14, wherein the light-emitting diode circuits are connected in series, and each light-emitting diode circuit comprises:

a load component configured to provide a resistance value, and an inner voltage is generated at a second terminal of the load component, and a voltage processor configured to receive the inner voltage and a threshold voltage, and compare the inner voltage with the threshold voltage to generate a comparison signal, wherein the light-emitting diode circuit counts time to acquire a time value from a starting time when the voltage processor starts to generate the comparison signal to a time when a level of the comparison signal changes, and uses the time value for sequencing.

18. The light-emitting diode light string as claimed in claim 17, wherein each light-emitting diode circuit further comprises:

a logic gate configured to receive the comparison signal and a clock signal, and perform a logic operation on the comparison signal and the clock signal to generate an output signal, and a counter configured to receive the output signal, wherein the light-emitting diode circuit is supplied power by a voltage and the inner voltage is gradually changed; when the inner voltage has not reached the threshold voltage, the comparison signal causes the output signal to be the clock signal and the counter counts time; until the inner voltage reaches the threshold voltage, the comparison signal causes the output signal to stop the counter from counting so as to acquire the time value during the counter counting time.

19. The light-emitting diode light string as claimed in claim 14, wherein a controller is configured to externally generate a clock frequency as the clock signal.

20. The light-emitting diode light string as claimed in claim 14, wherein each light-emitting diode circuit is configured to internally generate a clock frequency as the clock signal.

21. The light-emitting diode light string as claimed in claim 14, wherein before the light-emitting diode light string is powered on, a controller is configured to turn off a power switch coupled to a power-supplying path so that the inner voltage is discharged to zero.

* * * * *